United States Patent
Matsubara et al.

(10) Patent No.: US 6,862,493 B2
(45) Date of Patent: Mar. 1, 2005

(54) NUMERICAL CONTROL PROGRAMMING DEVICE AND NUMERICAL CONTROL PROGRAMMING METHOD

(75) Inventors: Susumu Matsubara, Tokyo (JP); Kenji Iriguchi, Tokyo (JP); Sadami Oouchi, Tokyo (JP); Kiyoshi Okada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/212,258

(22) Filed: Aug. 6, 2002

(65) Prior Publication Data

US 2003/0158621 A1 Aug. 21, 2003

(30) Foreign Application Priority Data

Feb. 21, 2002 (JP) ........................................ 2002-045220

(51) Int. Cl.[7] .............................................. G06F 19/00
(52) U.S. Cl. ........................ 700/182; 700/180; 700/181
(58) Field of Search ................................ 700/180, 181, 700/182

(56) References Cited

U.S. PATENT DOCUMENTS

| | | | | |
|---|---|---|---|---|
| 5,249,135 A | * | 9/1993 | Fujita | 700/179 |
| 5,402,349 A | * | 3/1995 | Fujita et al. | 700/97 |
| 5,544,046 A | | 8/1996 | Niwa | |
| 5,796,618 A | * | 8/1998 | Maeda et al. | 700/182 |
| 6,036,347 A | | 3/2000 | Tomita | |
| 6,065,858 A | * | 5/2000 | Yamaguchi et al. | 700/180 |
| 6,219,055 B1 | * | 4/2001 | Bhargava et al. | 345/850 |
| 6,324,438 B1 | * | 11/2001 | Cormier et al. | 700/118 |

FOREIGN PATENT DOCUMENTS

| | | |
|---|---|---|
| JP | 62-140748 | 6/1987 |
| JP | 5-104396 | 4/1993 |
| JP | 7-60603 | 3/1995 |
| JP | 8-69310 | 3/1996 |
| JP | 11-175124 | 7/1999 |

* cited by examiner

*Primary Examiner*—Leo Picard
*Assistant Examiner*—Carlos Ortiz-Rodriguez
(74) *Attorney, Agent, or Firm*—Leydig, Voit & Mayer, Ltd.

(57) ABSTRACT

A turning data generation unit and a drilling data generation unit generate machining data corresponding to machining forms generated by a machining form generation unit in consideration of the machining forms, and a machining program is generated to remove a machining form from a material form based on the machining data.

8 Claims, 21 Drawing Sheets

FIG.4

| UNo.UNIT | MODE | ANGLE B | POSITION C | REMOVAL ALLOWANCE A | BOTTOM | WALL | MACHINING ALLOWANCE A | MACHINED ALLOWANCE R |
|---|---|---|---|---|---|---|---|---|
| 1 END-MILLED SURFACE | ZY | 90.0 | 90.000 | 10.000 | 0 | @ | 0.000 | @ |

| SNo.TOOL | NOMINAL DIAMETER | APPROACH 1 | APPROACH 2 | METHOD | AFD | CUT A | CUT R | PERIPHERAL SPEED | FEED M | M |
|---|---|---|---|---|---|---|---|---|---|---|
| END MILLING | 10.0A | 0.000 | 0.000 | | | 0.000 | 0.000 | 0 | 0.000 | 0 0 |

| FIG | SHAPE | SURFACE SHIFT R | Z | Y | RADIUS R/θ | I | J | P | CORNER ROUGHNESS |
|---|---|---|---|---|---|---|---|---|---|
| 1 | LINE | 20.000 | 25.000 | 22.361 | | | | | |
| 2 | LINE | | -25.000 | 22.361 | | | | | |
| 3 | LINE | | -25.000 | -22.361 | | | | | |
| 4 | LINE | | 25.000 | -22.361 | | | | | |

FIG.21 FIG.22 FIG.23
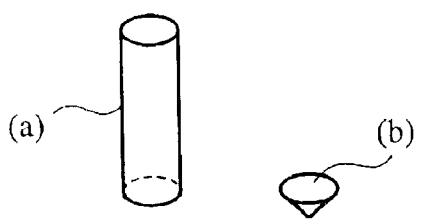
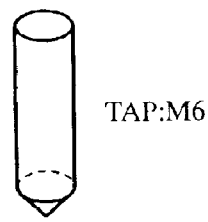
TAP:M6
FIG.24
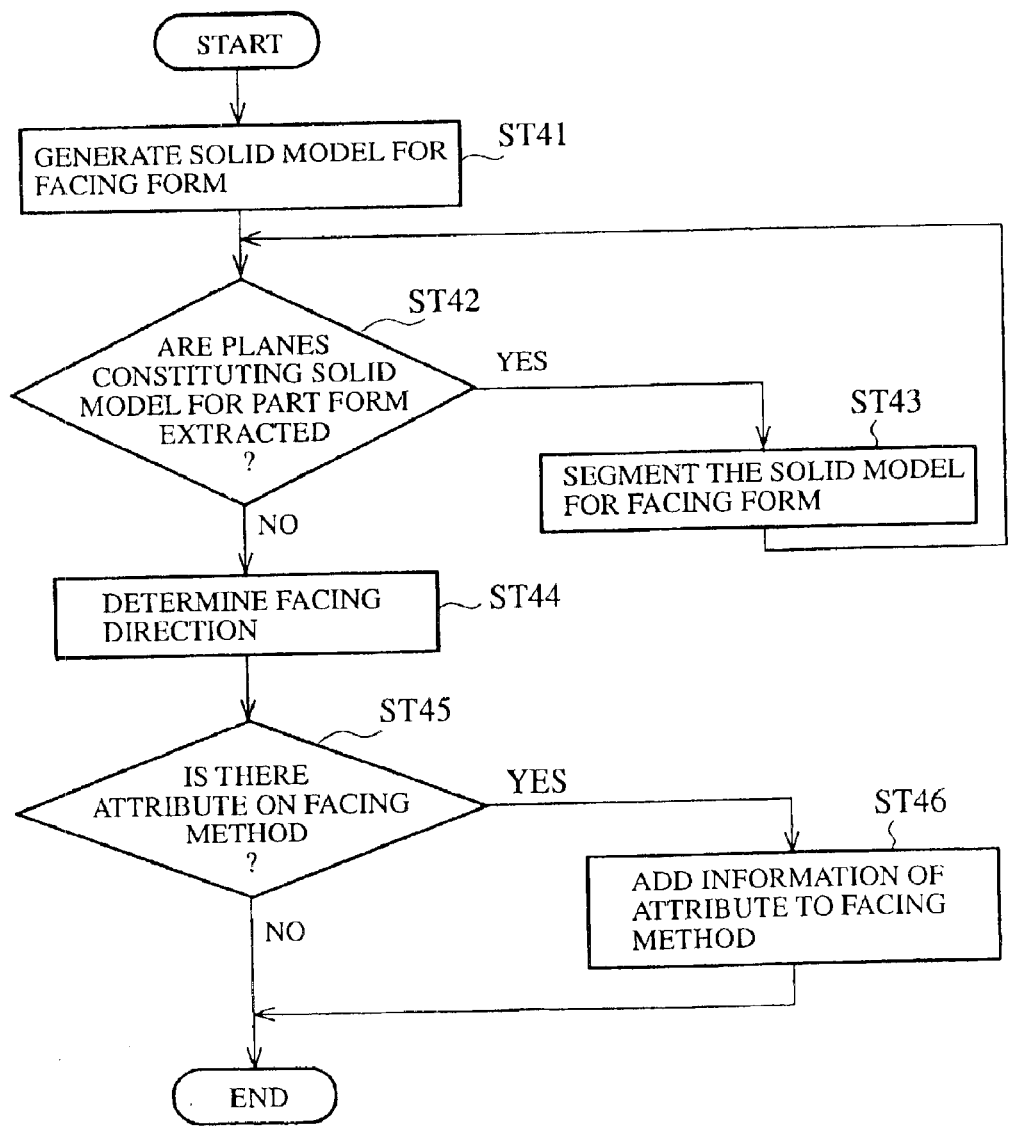

FIG.25
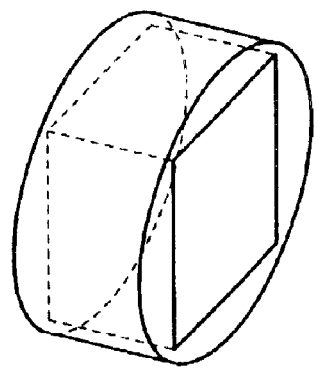
FIG.26
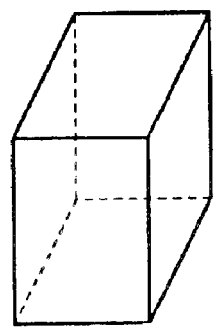
FIG.27A      FIG.27B
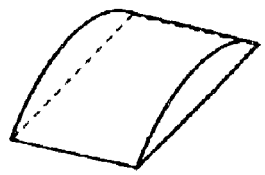   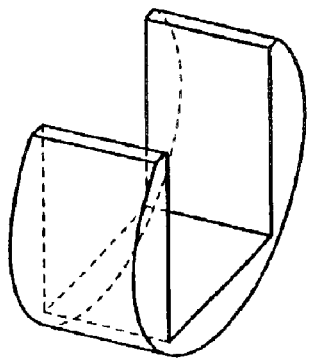

FIG.28A  FIG.28B
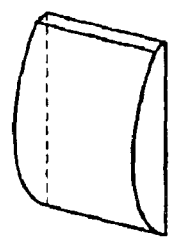 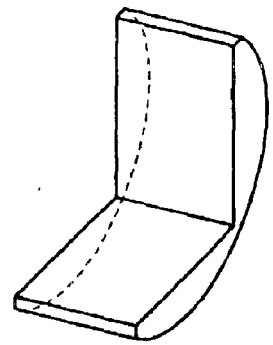
FIG.29A  FIG.29B
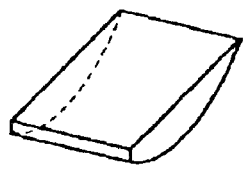 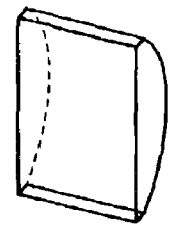
FIG.30
END MILLING DIRECTION:(1,0,0) SURFACE ROUGHNESS2
END MILLING DIRECTION:(0,1,0)
END MILLING DIRECTION:(0,-1,0)
END MILLING DIRECTION:(-1,0,0)
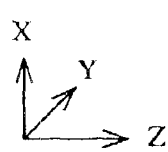

FIG.35

1 MATERIAL OUTSIDE DIAMETER30
  INSIDE DIAMETER0 MATERIAL LENGTH25
  MATERIAL END FACE0
2 OUTSIDE DIAMETER MACHINING
  TURNING TOOL
  LINE START POINT (10, 0, 25) END POINT (10, 0, 10)
3 OUTSIDE DIAMETRER GROOVING WIDTH3
  GROUPING DEPTH3
  GROOVING TOOL
  START POINT (10, 0, 19)
4 FACING
  FACING DIRECTION (1, 0, 0)
  FACING DEPTH:7.5
  END MILLING NOMINAL DIAMETER5
  LINE START POINT:(7.5, 13, 10) END POINT:(7.5, -13, 10)
  LINE START POINT:(7.5, -13, 10) END POINT:(7.5, -13, 0)
  LINE START POINT:(7.5, -13, 0) END POINT:(7.5, 13, 0)
  LINE START POINT:(7.5, 13, 0) END POINT:(7.5, 13, 10)
5 FACING
  FACING DIRECTION (0, -1, 0)
  FACING DEPTH:5
  END MILLING NOMINAL DIAMETER5
  LINE START POINT:(7.5, -10, 10) END POINT:(-11.2, -10, 10)
  LINE START POINT:(-11.2, -10, 10) END POINT:(-11.2, -10, 0)
  LINE START POINT:(-11.2, -10, 0) END POINT:(7.5, -10, 0)
  LINESTART POINT:(7.5, -10, 0) END POINT:(7.5, -10, 10)
6 FACING
  FACING DIRECTION(-1, 0, 0)
  FACING DEPTH:7.5
  END MILLING NOMINAL DIAMETER5
  LINE START POINT:(-7.5, -10, 10) END POINT:(-7.5, 13, 10)
  LINE START POINT:(-7.5, 13, 10) END POINT:(-7.5, 13, 0)
  LINE START POINT:(-7.5, 13, 0) END POINT:(-7.5, -10, 0)
  LINE START POINT:(-7.5, -10, 0) END POINT:(7.5, -10, 10)
7 FACING
  FACING DIRECTION(0, 1, 0) FACING DEPTH .'5
  END MILLING NOMINAL DIAMETER5
  LINE START POINT:(7.5, 10, 10) END POINT:(-7.5, 10, 10)
  LINE START POINT:(-7.5, 10, 10) END POINT:(-7.5, 10, 0)
  LINE START POINT:(-7.5, 10, 0) END POINT:(7.5, 10, 0)
  LINE START POINT:(7.5, 10, 0) END POINT:(7.5, 10, 10)
8 DRILLING TAP M6
  DRILLING DIRECTION (1, 0, 0) DRILLING DEPTH:15
  M6TAP (7.5, 0, 4)
9 CHAMFERING
  CHAMFERING2 DIRECTION(1, 0, 0)
  CHAMFERING END MILLING
  LINE START POINT (7.5, -10, 10) END POINT (7.5, -10, 0)

FIG. 37

```
START
  ↓
READ MACHINING PROGRAM          — ST61
  ↓
GENERATE SOLID MODEL FOR        — ST62
MATERIAL FORM
  ↓
GENERATE SOLID MODEL FOR        — ST63
CONTOUR
  ↓
GENERATE SOLID MODEL FOR        — ST64
MECHINING REMOVAL FORM
  ↓
SUBTRACT SOLID MODEL FOR        — ST65
MECHINING REMOVAL FORM FROM
SOLID MODEL FOR MATERIAL FORM
  ↓
END
```

FIG. 38

```
1 MATERIAL
   OUTSIDE DIAMETER 120 INSIDE DIAMETER 0
   MATERIAL LENGTH 100 MATERIAL END FACE 20
2 PERIPHERAL AND END MILLING START POINT X:60
   START POINT Z:20 END POINT Z:0 END POINT Z:0
3 OUTSIDE DIAMETER MACHINING
   LINE START POINT X:30 START POINT Z:0
   END POINT X:60 END POINT Z:-60
4 FACING MODE ANGLE B:30
   DEGREES POSITION C:0 FACING DEPTH:10
   RECTANGLE SHIFT X:30 SHIFT Z :-30
   START POINT X:0 START POINT Y:0
   END POINT X:20 END POINT Y :-20
```

NUMERICAL CONTROL PROGRAMMING DEVICE AND NUMERICAL CONTROL PROGRAMMING METHOD

BACKGROUND OF THE INVENTION

1. Field of the Invention

The present invention relates to a numerical control programming device and a numerical control programming method, for automatically generating a machining program.

2. Description of Related Art

A conventional numerical control programming device disclosed, for example, in Japanese Patent Application Laid Open Gazette No. 5-104396 extracts a machining form from an inputted material form and a part form to generate a machining program for turning.

Then, the device segments the machining form into an outside diameter machining form and an inside diameter machining form, and the like, to automatically generate the machining program.

The conventional numerical control programming device thus constructed as above allows automatic generation of the machining program for turning, but disallows generation of a machining program for machining other than the turning, even though the machining corresponding to the machining form is a one other than turning (e.g., facing, drilling and planing).

SUMMARY OF THE INVENTION

The present invention has been made to solve the above problem and an object thereof is to provide a numerical control programming device and a numerical control programming method for performing a proper machining corresponding to a machining form.

According to an aspect of the present invention, the numerical control programming device includes machining data generation means for generating machining data corresponding to a machining form generated by form generation means in consideration of the features of the machining form and generates a machining program to remove the machining form from a material form on the basis of the machining data. Therefore, it is possible to perform a proper machining corresponding to the machining form.

According to another aspect of the present invention, the numerical control programming device subtracts a machining removal form generated by machining removal form generation means from a material form generated by material form generation means to generate a part form. Therefore, it is possible to confirm the part form to be machined without finding a tool locus by a machining program and performing an actual machining.

According to still another aspect of the present invention, the numerical control programming method generates machining data corresponding to a machining form in consideration of the features of the machining form and generates a machining program to remove the machining form from a material form on the basis of the machining data. Therefore, it is possible to perform a proper machining corresponding to the machining form.

According to yet another aspect of the present invention, the numerical control programming method subtracts a machining removal form from a material form to generate a part form. Therefore, it is possible to confirm the part form to be machined without finding a tool locus by a machining program and performing an actual machining.

BRIEF DESCRIPTION OF THE DRAWINGS

FIGS. 2A to 2D are perspective views showing a part form, a material form and the like;

FIG. 4 is a chart showing an exemplary machining unit of a machining program;

FIGS. 21A and 21B are perspective views each showing an exemplary extraction of drilling plane;

FIG. 22 is a perspective view showing a drilling form obtained by grouping drilling forms;

FIG. 23 is a perspective view showing a drilling form with an attribute of "Tapping: M6";

FIG. 24 is a flowchart showing a processing of a facing data generation unit;

FIG. 25 is a perspective view showing a facing form;

FIG. 26 is a perspective view showing planes constituting a part form;

FIGS. 27A and 27B, 28A and 28B and 29A and 29B are perspective views each showing a segmented form;

FIG. 30 is an explanatory drawing showing a facing method;

FIG. 35 is a list showing an exemplary machining program;

FIG. 37 is a flowchart showing a numerical control programming method according to a second embodiment;

FIG. 38 is a list showing an exemplary machining program;

DETAILED DESCRIPTION OF THE PREFERRED EMBODIMENTS

The preferred embodiments of the present invention will hereinafter be described in detail with reference to the accompanying drawings.

First Embodiment

Figure 1:
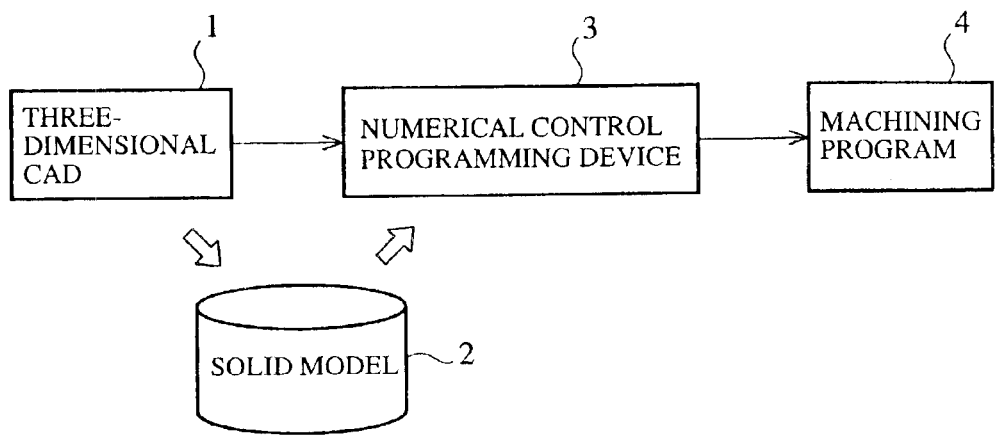
FIG. 1 is a block diagram showing a CAD/CAD system to which a numerical control programming device according to a first embodiment of the present invention is applied.

FIG. 1 is a block diagram showing a CAD/CAD system to which a numerical control programming device according to the first embodiment of the present invention is applied.

Referring to FIG. 1, reference numeral 1 denotes a three-dimensional CAD for designing parts to generate solid models 2 for a part form and material form, reference numeral 2 a solid model for a part form or material form generated by the three-dimensional CAD 1, reference numeral 3 a numerical control programming device for generating a machining program 4 on the basis of the solid model 2 for a part form or material form and reference numeral 4 a machining program generated by the numerical control programming device 3.

Figure 2A:
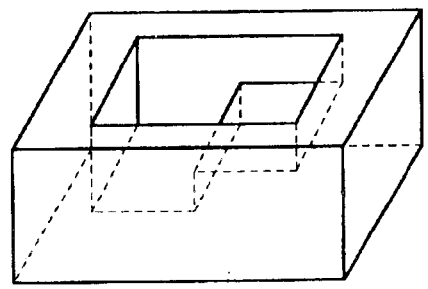
Figure 2B:
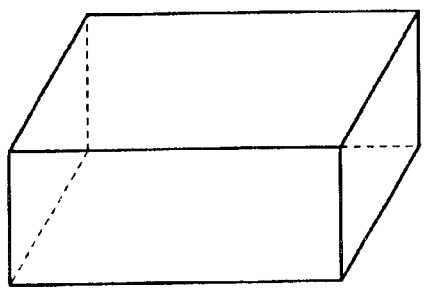
Figure 2C:
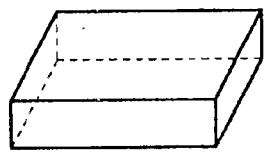
Figure 2D:
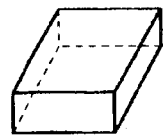

In a case where a part form is a form shown in FIG. 2A and a material form is a form shown in FIG. 2B, the numerical control programming device 3 generates a machining program for facing a form shown in FIG. 2C and a form shown in FIG. 2D.

Figure 3:
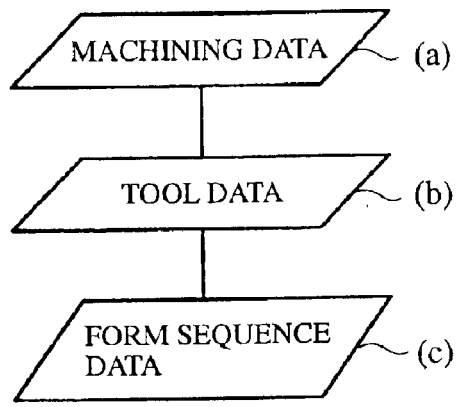
FIG. 3 is an explanatory drawing showing an exemplary construction of machining units.

FIG. 3 is an explanatory drawing showing a construction of machining units (a) to (c) which are constituent elements of the machining program 4. The machining data (a) is information on a machining method, the tool data (b) is information on tools to be used and machining condition and the form sequence data (c) of single form is form information defining a form to be machined. FIG. 4 is a chart showing an exemplary machining unit of a machining program.

In FIG. 4, the program represented by "UNo." indicates the machining data (a), the program represented by "SNo." indicates the tool data (b) and the program represented by "FIG" indicates the form sequence data (c).

Figure 5:
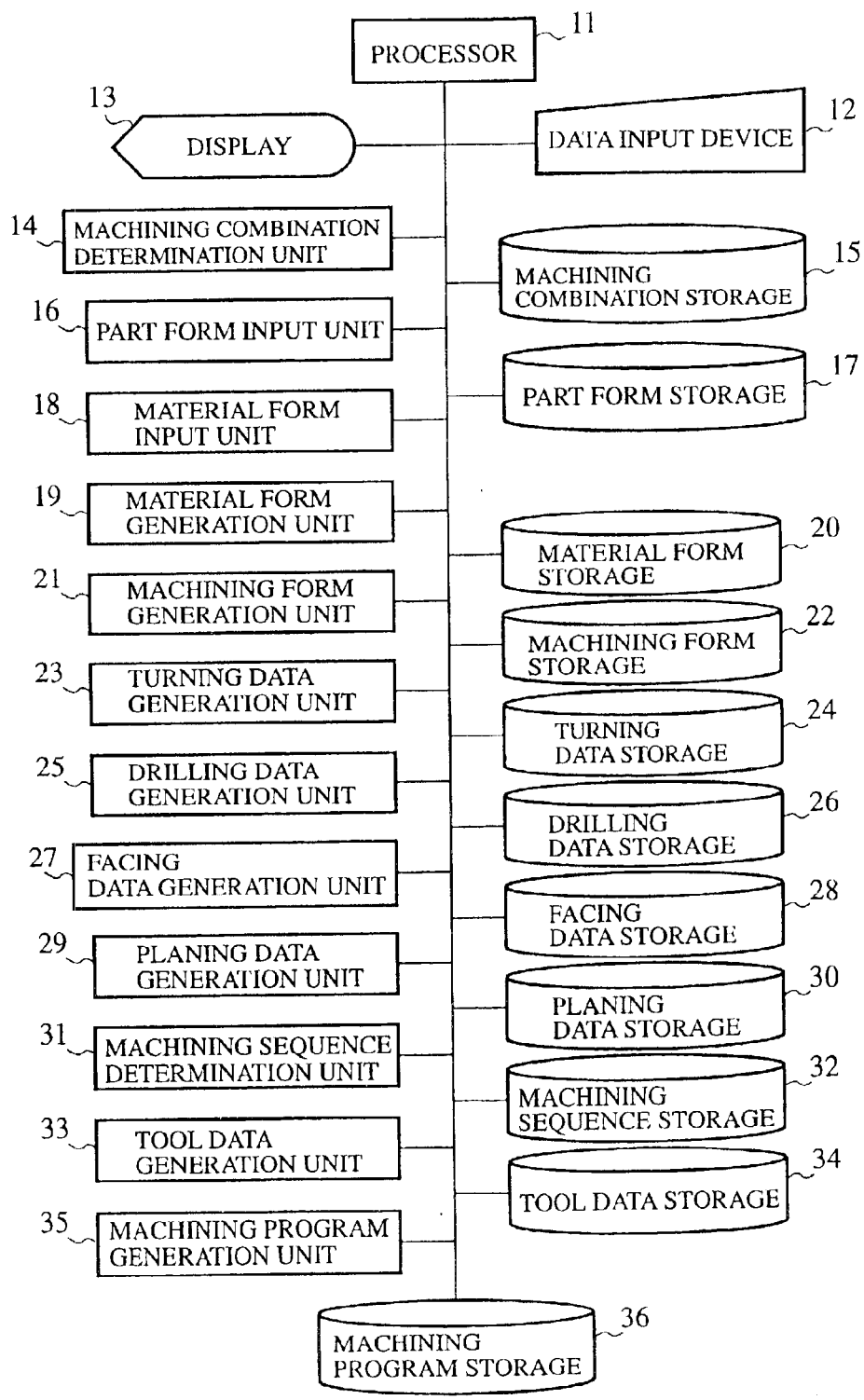
FIG. 5 is a system configuration showing the numerical control programming device according to a first embodiment.

FIG. 5 is a a system configuration showing the numerical control programming device according to the first embodiment of the present invention.

Referring to FIG. 5, reference numeral 11 denotes a processor for entirely controlling the numerical control programming device, reference numeral 12 a data input device for receiving therefrom input specifying how the programming device machines requested by an operator and the like, reference numeral 13 a display for displaying thereon the various data, the process program and the like, reference numeral 14 a machining combination determination unit for determining the combination of machining to be actually performed among turning, drilling, facing and planing, reference numeral 15 a machining combination storage for storing therein the combination of machining determined by the machining combination determination unit 14.

Reference numeral 16 denotes a part form input unit for inputting therefrom the solid model for part form generated by the three-dimensional CAD 1, reference numeral 17 a part form storage for storing therein the solid model for a part form inputted by the part form input unit 16, reference numeral 18 a material form input unit for inputting therefrom the solid model for a material form generated by the three-dimensional CAD 1, reference numeral 19 a material form generation unit for generating a solid model for a material form from the solid model for a part form generated by the three-dimensional CAD 1 and reference numeral 20 a material form storage for storing therein the solid models for a material form outputted from the material form input unit 18 or the material form generation unit 19.

Reference numeral 21 denotes a machining form generation unit (machining form generating means) for subtracting the solid model for a part form stored in the part form storage 17 from the solid model for a material form stored in the material form storage 20 to generate a solid model for machining form, and reference numeral 22 a machining form storage for storing therein the solid model for a machining form generated by the machining form generation unit 21.

Reference numeral 23 denotes a turning data generation unit for generating turning data consisting of a solid model for a turning machining form used for turning on the basis of the solid model for machining form stored in the machining form storage 22, a solid model for a ½ sectional form and a turning method, reference numeral 24 a turning data storage for storing therein the turning data generated by the turning data generation unit 23, reference numeral 25 drilling data generation unit for generating drilling data consisting of a solid model for a drilling form used for drilling on the basis of the solid model for a machining form stored in the machining form storage 22, and a drilling method and reference numeral 26 a drilling data storage for storing therein the drilling data generated by the drilling data generation unit 25.

Reference numeral 27 denotes a facing data generation unit for generating facing data consisting a solid model for a facing form used for facing on the basis of the solid model for a machining form stored in the machining form storage 22, the solid model for a turning form stored in the turning data storage 24 and the solid model for a drilling form stored in the drilling data storage 26 and a facing method, reference numeral 28 a facing data storage for storing therein the facing data generated by the facing data generation unit 27, reference numeral 29 a planing data generation unit for generating planing data consisting of a solid model for a planing form used for planing on the basis of the solid model for a machining form stored in the machining form storage 22 and the solid model for a part form stored in the part form storage 17 and a planing method, and reference numeral 30 a planing data storage for storing therein the planing data generated by the planing data generation unit 29. Further, the turning data generation unit 23, the drilling data generation unit 25, the facing data generation unit 27 and the planing data generation unit 29 constitute machining data generation means. Hereinafter, the solid model for a part form is referred to simply as a part form, the solid model for a material form as a material form, the solid model of a machining form as a machining form, the solid model for a turning form as a turning form, the solid model for a ½ sectional form as a ½ sectional form, the solid model for a drilling form as a drilling form, the solid model for a facing form as a facing form and the solid model for a planing form as a planing form.

Reference numeral 31 denotes a machining sequence determination unit for determining the machining sequence, for example, in consideration of the priority of sorts of machining, reference numeral 32 a machining sequence storage for storing therein the machining sequence determined by the machining sequence determination unit 31, reference numeral 33 a tool data generation unit for generating tool data corresponding to the respective machining data generated in correspondence with the turning, the drilling, the facing and the planing, reference numeral 34 a tool data storage for storing therein the tool data generated by the tool data generation unit 33, reference numeral 35 a machining program generation unit for generating a machining program to remove the machining form from the material form on the basis of the machining sequence stored in the machining sequence storage 32, the respective machining data corresponding to the turning, the drilling, the facing and the planing stored in the turning data storage 24, the drilling data storage 26, the facing data storage 28 and the planing data storage 30 and the tool data stored in the tool data storage 34, and reference numeral 36 a machining program storage for storing therein the machining program generated by the machining program generation unit 35. Further, the machining sequence determination unit 31, the tool data generation unit 33 and the machining program generation unit 35 constitute program generation means.

Next, the operation of the numerical control programming device of the first embodiment will be described.

First, when the data input device 12 is manipulated by an operator to input how the programming device machines, the machining combination determination unit 14 determines the combination of machining to be actually performed among the turning, the drilling, the facing and the planing in determining the input and stores the determined machining combination into the machining combination storage 15.

Further, when the operator does not particularly specify how the programming device machines, the machining combination is determined, assuming that all the machining which are allowed by the machine specification should be performed. In this case, the machine specification is being set in a parameter storage inside the NC device.

Here, for the sake of descriptions, it is assumed that all of the machining, i.e., the turning, the drilling, the facing and the planing are performed.

Next, the part form input unit 16 is manipulated by the operator to input the part form generated by the three-dimensional CAD 1 and then the part form is stored in the part form storage 17.

Figure 6A:
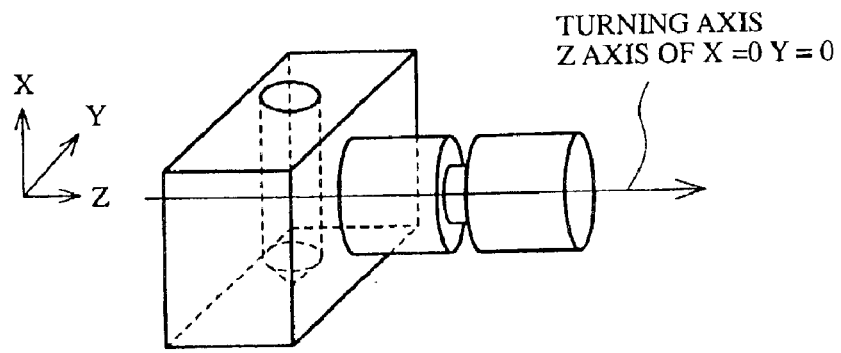
FIGS. 6A and 6B are perspective views each showing an exemplary part form.
Figure 6B:
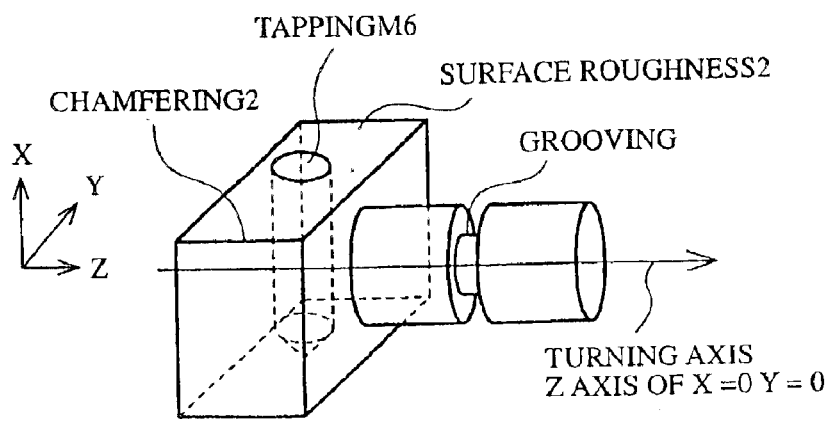

FIGS. 6A and 6B are perspective views each showing an exemplary part form. In particular, FIG. 6B is a perspective view showing an exemplary part form with an attribute related to the machining.

Subsequently, the material form input unit 18 is manipulated by the operator to input the material form generated by the three-dimensional CAD 1 and then the material form is stored in the material form storage 20.

In a case where no material form is generated by the three-dimensional CAD 1, however, the material form generation unit 19 may generate a material form from the part form generated by the three-dimensional CAD 1.

Figure 7:
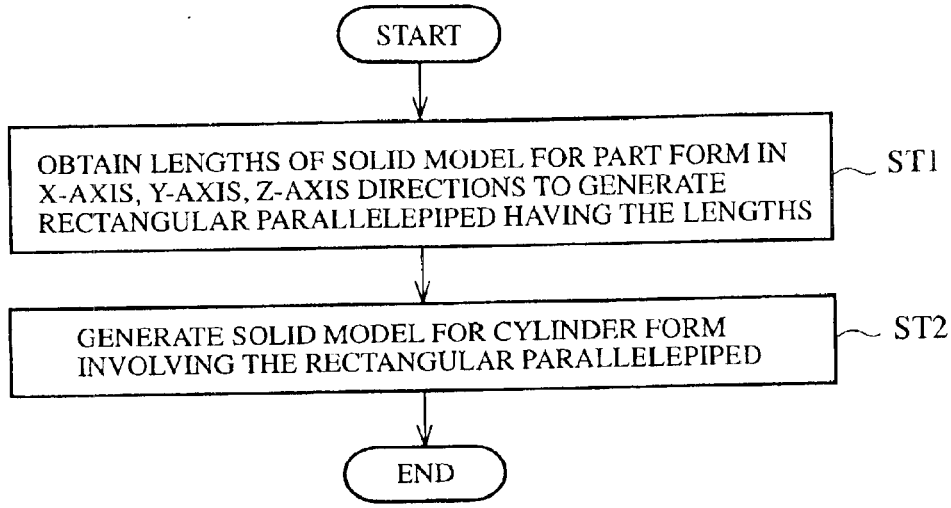
FIG. 7 is a flowchart showing a processing of a material form generation unit.

Specifically, the material form generation unit 19 generates the material form as follows. FIG. 7 is a flowchart showing a processing of the material form generation unit 19.

First, the material form generation unit 19 finds the lengths of the part form in the X-axis, Y-axis and Z-axis directions from the part form stored in the part form storage 17. Then, as shown in FIG. 8, the material form generation unit 19 generates a rectangular parallelepiped having the same lengths as those of the part form in the X-axis, Y-axis and Z-axis directions (Step ST1).

Figure 8:
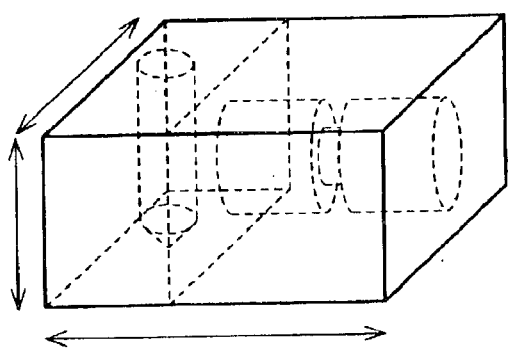
FIG. 8 is a perspective view showing an example of rectangular parallelepiped.
Figure 9:
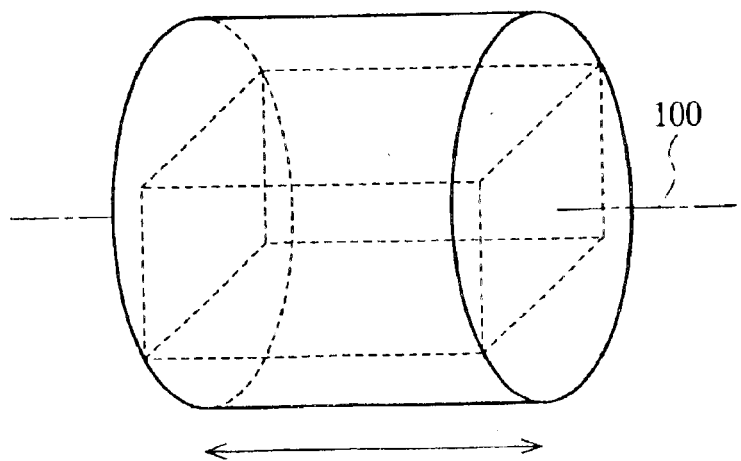
FIG. 9 is a perspective view showing a material form involving therein the rectangular parallelepiped.

Next, as shown in FIG. 9, the material form generation unit 19 generates a solid model for a cylinder form around the central axis 100 involving the rectangular parallelepiped of FIG. 8, in consideration of machining allowance, as a material form (Step ST2). The central axis 100 serves as the axis of rotation in the turning.

Further, the solid model for a material form generated by the material form generation unit 19 is stored in the material form storage 20.

Figure 10:
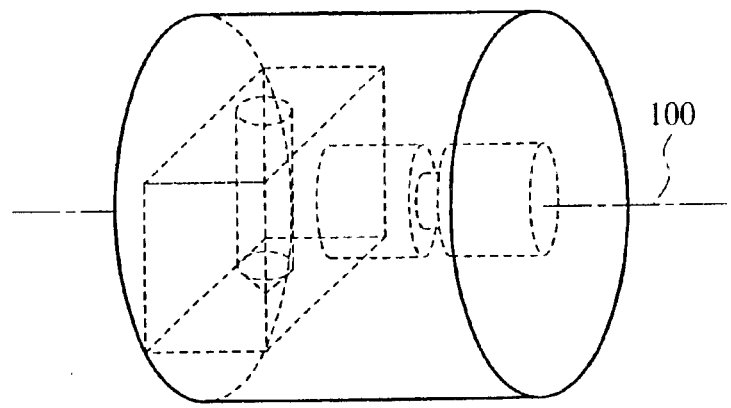
FIG. 10 is a perspective view showing a machining form.

When the part form and the material form are stored into the part form storage 17 and the material form storage 20 as above, the machining form generation unit 21 subtracts the part form from the material form to generate a machining form, as shown in FIG. 10, and stores the machining form into the machining form storage 22.

Figure 11:
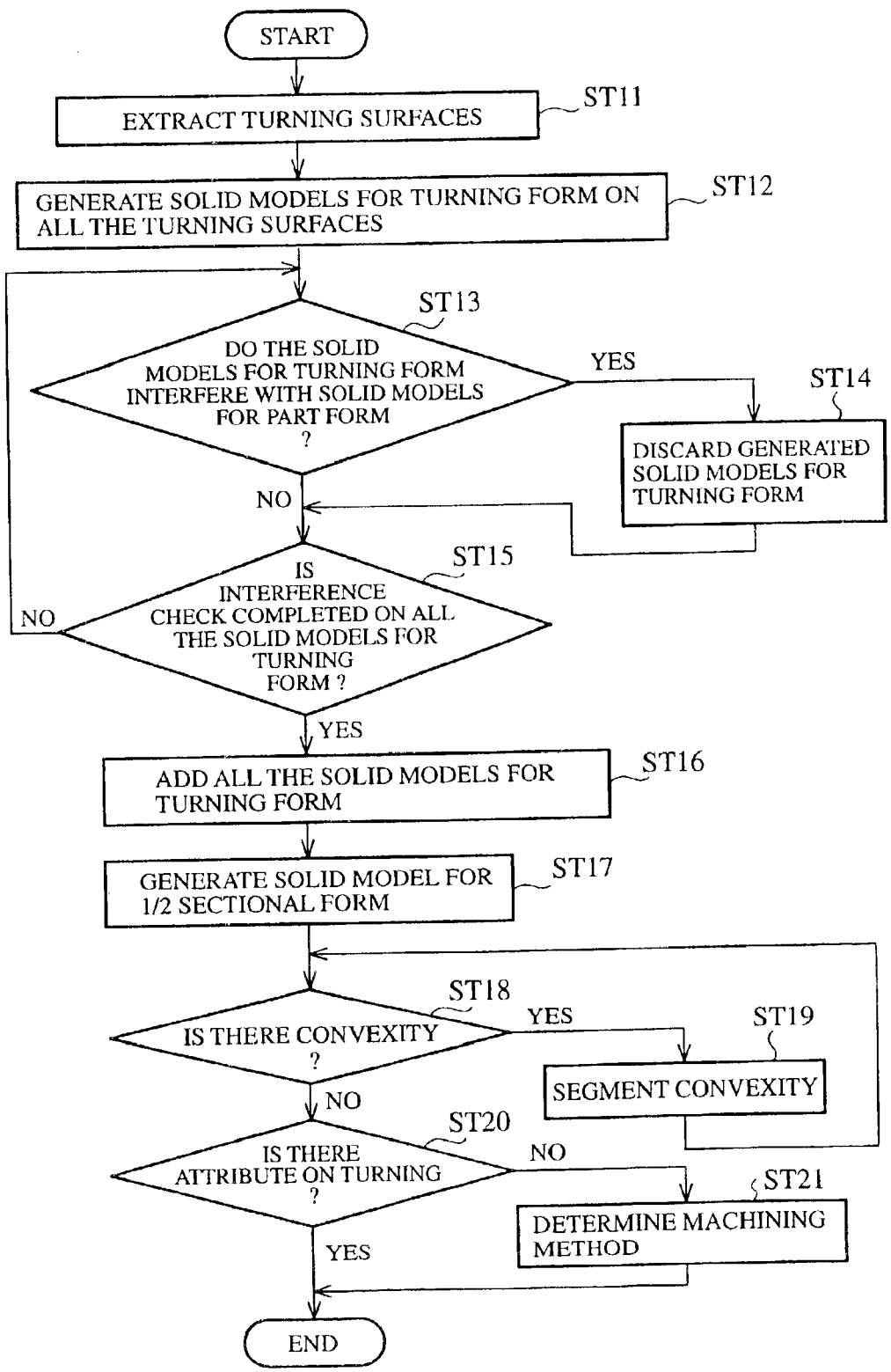
FIG. 11 is a flowchart showing a processing of a turning data generation unit.

When the machining form is stored into the machining form storage 22, the turning data generation unit 23 generates turning data used for turning on the basis of the machining form. FIG. 11 is a flowchart showing a processing of the turning data generation unit 23, and the processing thereof will be described in detail below, referring to FIG. 11.

Figures 12A, 12B, 12C:
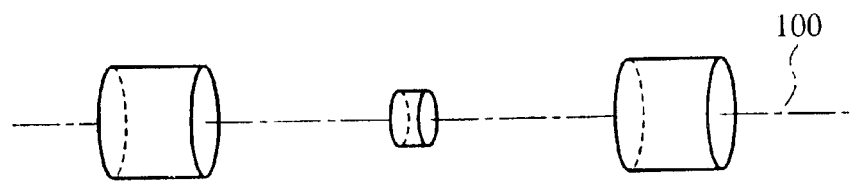
FIGS. 12A to 12C are perspective views each showing an exemplary extraction of facing plane.

First, the turning data generation unit 23 extracts turning surfaces from the machining form, for example, according to the following extraction rules for turning surfaces (Step ST11). FIG. 12 is a perspective view showing an exemplary extraction of the turning surfaces. Further, as the turning surfaces, a cylindrical surface, a conical surface and a torus surface are taken for discussion.

Extraction Rules for Turning Surfaces

1) Extract a cylindrical surface having the same central axis as the turning axis;
2) Extract a conical surface having the same central axis as the turning axis;

3) Extract a torus surface having the same central axis as the turning axis.

The turning data generation unit 23 generates turning forms for the turning surfaces having the same central axes as all the turning axes on the basis of the above extraction rules for the turning surfaces (Step ST12).

Figures 13A, 13B, 13C:
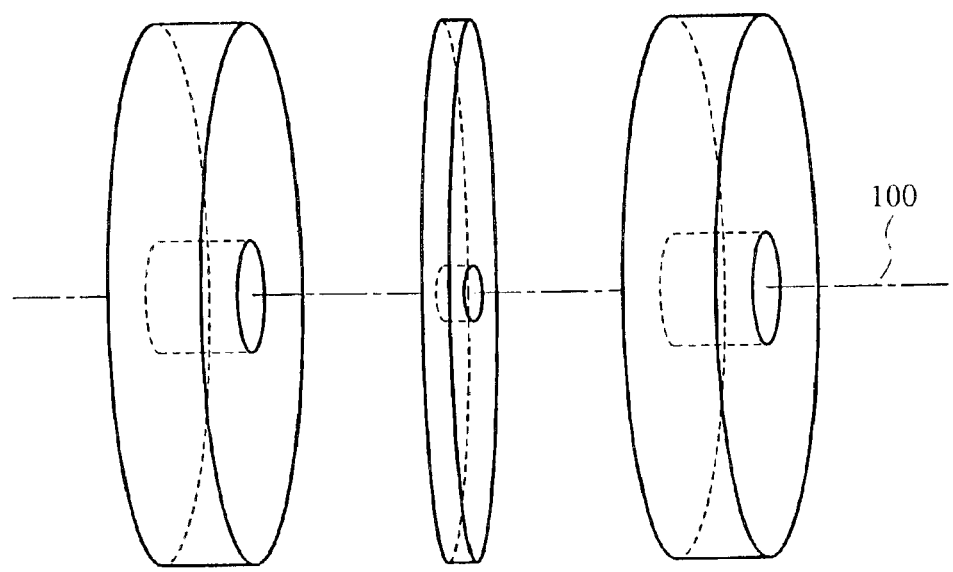
FIGS. 13A to 13C are perspective views each showing an offset form.

Specifically, first, a solid model for an offset form extended in a direction perpendicular to the turning axis is generated so that the extracted turning surfaces may be larger than the material form (see FIG. 13).

Figures 14A, 14B, 14C:
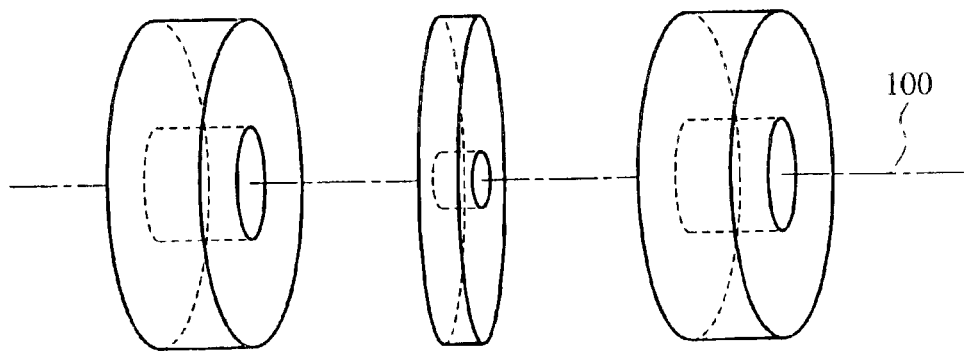
FIGS. 14A to 14C are perspective views each showing a turning form.

Next, by multiplying the solid model for an offset form and the machining form stored in the machining form storage 22, a turning form is generated (see FIG. 14).

After the turning form is generated as above, the turning data generation unit 23 executes an interference check of the turning form and the part form (Step ST13).

A method for the interference check involves multiplication of the turning form and the part form stored in the part form storage 17, judgement that there occurs no interference When there is no form as the result of multiplication, and judgement that there occurs an interference when there is a form as the result of multiplication.

The turning data generation unit 23 discards the turning form which is judged to be interfered with the part form as a result of the interference check (Step ST14).

Figure 15:
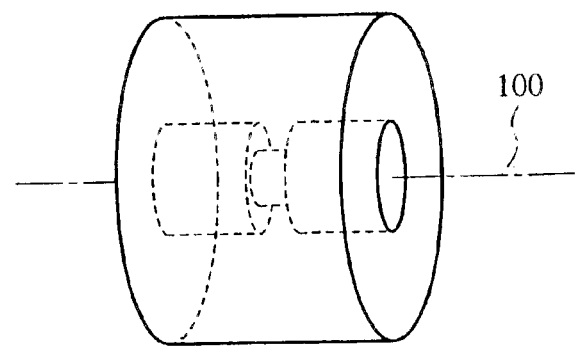
FIG. 15 is a perspective view showing a turning form.

When the interference check is finished on all the turning forms (Step ST15), the turning data generation unit 23 adds the solid models for all the turning forms to generate a final turning form, as shown in FIG. 15 (Step ST16). The generated turning form is stored into the turning data storage 24.

Figure 16:
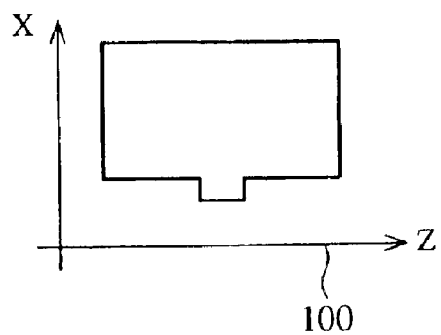
FIG. 16 is a cross section showing a ½ sectional form.

Next, the turning data generation unit 23 cuts the turning form by a plane extending along the turning axis 100, as shown in FIG. 16, to generates a ½ sectional form on an XY plane (Step ST17).

The turning data generation unit 23 checks if the ½ sectional form includes convexity (Step ST18). Then, when there is convexity, the turning data generation unit 23 calculates the lengths of the whole form in the X-axis and Z-axis directions and segments the convexity according to the following segmentation rules.

Segmentation Rules

1) Segment the convexity in parallel to the X-axis when the ½ sectional form is longer in the X-axis direction;
2) Segment the convexity in parallel to the Z-axis when the ½ sectional form is longer in the Z-axis direction.

Figure 17:
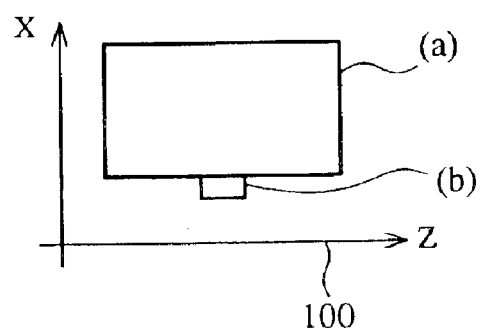
FIGS. 17A and 17B are cross sections each showing a ½ sectional form sectioned in the X-axis direction.

Further, FIGS. 17A and 17B show the ½ sectional forms segmented in parallel to the Z-axis, and the ½ sectional forms thus segmented are stored into the turning data storage 24.

Next, the turning data generation unit 23 checks if any attribute is attached on the turning method, with reference to the part form stored in the part form storage 17 (see FIG. 6B) (Step ST20).

Then, when some attribute is attached on the turning method, the information of the attribute attached on the turning method is added to the turning data stored in the turning data storage 24.

On the other hand, when no attribute is attached on the turning form (turning method), the lengths of the ½ sectional form in the X-axis and Z-axis directions are obtained, and the turning method is determined, for example, according to the following determination rules for a turning method (Step ST21). Then, the determined turning method is added to the turning data stored in the turning data storage 24.

Determination Rules for Turning Method

1) Peripheral and end milling method or back milling method is adopted when the ½ sectional form is longer in the X-axis direction:
   a. Peripheral and end milling method is adopted when machining from the +Z direction;
   b. Back machining method is adopted when machining from the −Z direction;
2) Outside diameter machining method or inside diameter machining method is adopted when the ½ sectional form is longer in the Z-axis direction:
   a. Outside diameter machining method is adopted when machining from the +X direction;
   b. Inside diameter machining method is adopted when machining from the −X direction.

Figure 18:
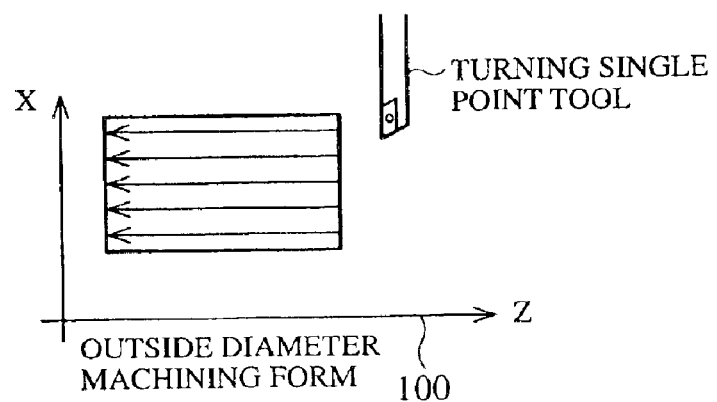
FIG. 18 is a cross section showing a machining form in the outside diameter direction.

For example, with respect to the form shown in FIG. 17A, since the ½ sectional form is longer in the Z-axis direction, the outside diameter machining method is adopted as the machining from the +X direction, as shown in FIG. 18.

Figure 19:
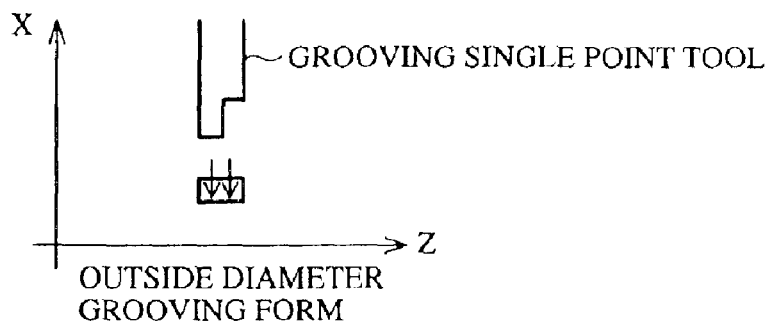
FIG. 19 is a cross section showing a grooving form in the outside diameter direction.

Further, since the form shown in FIG. 17B has an attached attribute of "end-face machining" as shown in FIG. 6B, the outside diameter peripheral and end milling method is adopted as the machining, as shown in FIG. 19.

Figure 20:
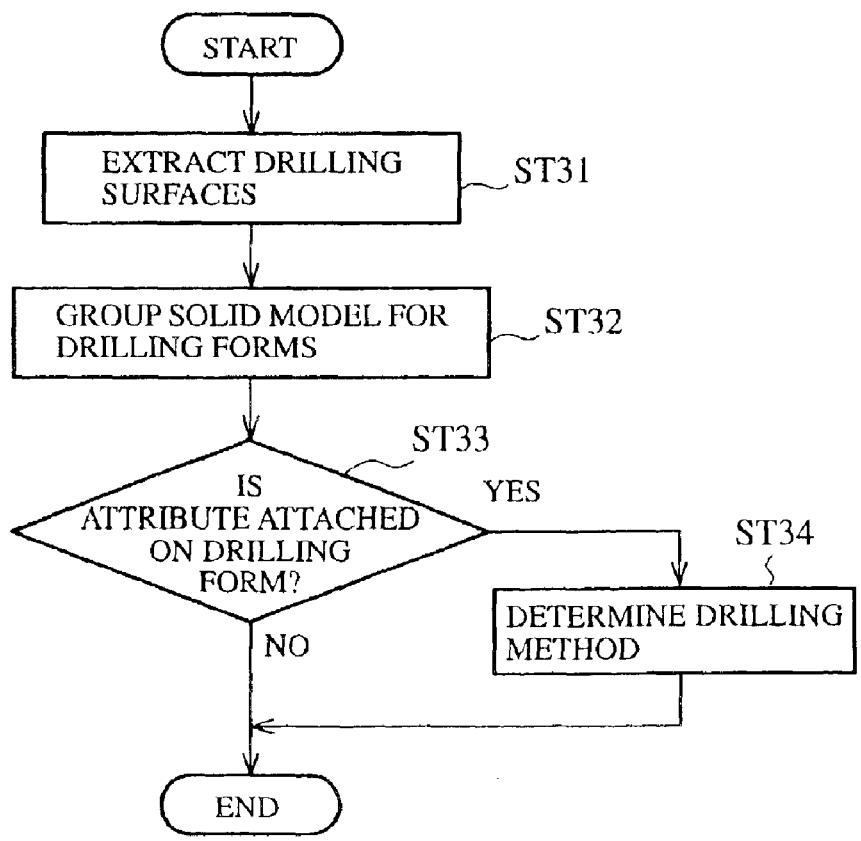
FIG. 20 is a flowchart showing a processing of a drilling data generation unit.

Next, the drilling data generation unit 25 generates drilling data used for drilling on the basis of the machining form stored in the machining form storage 22. FIG. 20 is a flowchart showing a processing of the drilling data generation unit 25, and the processing thereof will be described in detail below, referring to FIG. 20.

First, the drilling data generation unit 25 extracts drilling surfaces form the machining form, for example, according to the following extraction rules for drilling surfaces (Step ST31). FIG. 21 is a perspective view showing an exemplary extraction of the drilling surfaces. Further, as the drilling surfaces, a cylindrical surface and a conical surface are taken for discussion.

Extraction Rules for Drilling Surfaces

1) Extract a complete cylindrical surface;
2) Extract a complete conical surface.

After the drilling surfaces are extracted according to the above extraction rules for drilling surfaces, the drilling data generation unit 25 generates drilling forms by adding ends of the cylindrical surfaces from the drilling surfaces, and groups the drilling forms, for example, according to the following grouping rules (Step ST32). FIG. 22 is a perspective view showing a drilling form obtained by grouping the drilling forms.

Grouping Rules

Put solid models having the same cylindrical axis or conical axis and being adjacent to one another into the same group.

Further, the drilling form obtained by the above grouping is stored into the drilling data storage 26 as the drilling data.

Next, the drilling data generation unit 25 checks if any attribute is attached on the drilling form (the drilling method), with reference to the part form stored in the part form storage 17 (see FIG. 6B) (Step ST33).

Then, when some attribute is attached on the drilling method, the information of the attribute attached on the drilling method is added to the drilling data stored in the drilling data storage 26.

FIG. 23 is a perspective view showing a drilling form in a case where an attribute is attached on the drilling method of "Tapping: M6".

On the other hand, when no attribute on the drilling method is attached, the drilling method is determined, for example, according to the following determination rules for a drilling method (Step ST34). Then, the determined drilling method is added to the drilling data stored in the drilling data storage 26.

Determination Rules for Drilling Method
1) A drilling method is adopted for a non-through hole;
2) A boring method is adopted for a through hole.

Next, the facing data generation unit 27 generates facing data used for facing on the basis of the machining form stored in the machining form storage 22, the turning data stored in the turning data storage 24 and the drilling data stored in the drilling data storage 26. FIG. 24 is a flowchart showing a processing of the facing data generation unit 27, and the processing thereof will be described in detail below, referring to FIG. 24.

First, the facing data generation unit 27 subtracts the turning form of the turning data and the drilling form of the drilling data from the machining form, to generate a facing form (Step ST41). FIG. 25 is a perspective view showing a facing form.

Next, after planes constituting the part form are extracted from the facing form as shown in FIG. 26 (Step ST42), the facing data generation unit 27 calculates the thicknesses of the respective planes in a vertical direction and segments the facing form with one thinnest surface used as a cutting plane, to generate a solid model for the segmented form. Hereinafter, the solid model for the segmented form is referred to simply as a segmented form (Step ST43). FIGS. 27A and 27B are perspective views showing segmented forms. FIGS. 28A, 28B, 29A and 29B are perspective views showing segmented forms obtained by further segmenting the segmented form of FIG. 27B.

Further, the facing forms segmented as above are stored into the facing data storage 28 as the facing data.

Next, the facing data generation unit 27 determines a machining direction of the segmented facing form (Step ST44), for example, according to the following determination rules for a facing method, and the machining direction is added to the facing data stored in the facing data storage 28.

Determination Rules for Facing Method

Let suppose that the machining direction is a direction perpendicular to the segmented plane.

Next, the facing data generation unit 27 checks if any attribute is attached on the facing method, with reference to the part form stored in the part form storage 17 (see FIG. 6B) (Step ST45).

Then, when some attribute is attached on the facing method, in other words, when information on surface roughness (e.g., surface roughness 2) is attached, the information of the attribute attached on the facing is added to the facing data stored in the facing data storage 28.

FIG. 30 is a view showing a facing method.

Figure 31:
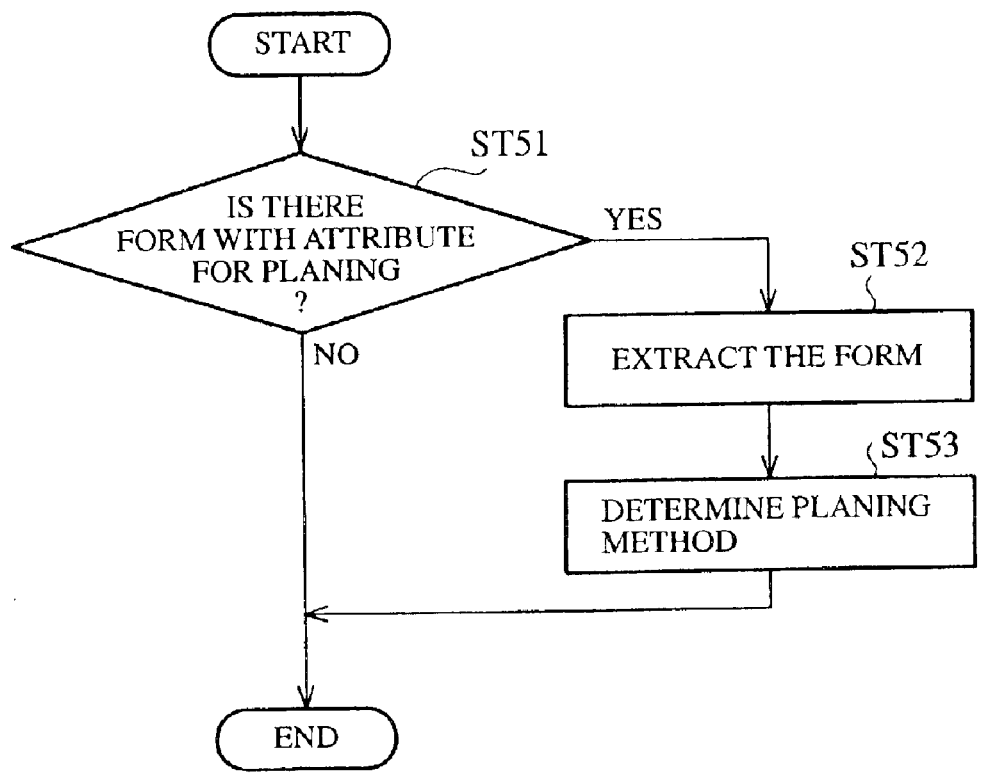
FIG. 31 is a flowchart showing a processing of a planing data generation unit.

Next, the planing data generation unit 29 generates planing data used for planing on the part form stored in the part form storage 17 and the machining form stored in the machining form storage 22. FIG. 31 is a flowchart showing a processing of the planing data generation unit 29, and the processing thereof will be described in detail below, referring to FIG. 31.

First, the planing data generation unit 29 checks if there is a machining form with any attribute attached on a planing, with reference to the processed form stored in the machining form storage 22 and the part form stored in the part form storage 17 (see FIG. 6B) (Step ST51).

Figure 32:
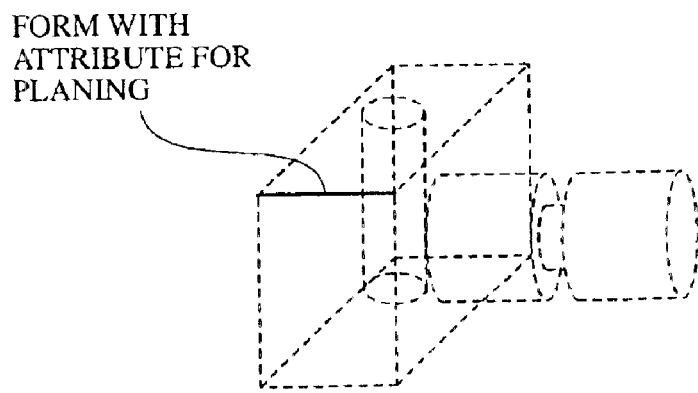
FIG. 32 is a perspective view showing a machining form with an attribute with the planing.

When there is a machining form with some attribute attached on a planing, the planing data generation unit 29 extracts the machining form as shown in FIG. 32 (Step ST52).

Here, the machining form extracted by the planing data generation unit 29 is stored into the planing data storage 30 as planing data.

Next, the planing data generation unit 29 determines a planing method (e.g., chamfering 2) from the attribute attached on the planing (Step ST53), and the determined planing method, is added to the planing data stored in the planing data storage 30.

When the machining data generation units generate the respective machining data as above, the machining sequence determination unit 31 determines a machining sequence, for example, according to the following determination rules for machining sequence.

Determination Rules for Machining Sequence
1) A machining proceeds in order of the turning, the facing, the drilling and the planing;
2) The turning proceeds in order of positions far from the turning axis;
3) The facing proceeds in order of holes with the shallowest machining depth.

Further, the machining sequence determined by the machining sequence determination unit 31 is stored into the machining sequence storage 32.

Next, the tool data generation unit 33 generates tool data corresponding to the respective machining data of the turning, the drilling, the facing and the planing, which are generated by the respective machining data generation units. Here, the tool data generated by the tool data generation unit 33 is stored into the tool data storage 34.

Finally, the machining program generation unit 35 generates a machining program to remove the machining form from the material form on the basis of the machining sequence stored in the machining sequence storage 32, the turning data stored in the turning data storage 24, the drilling data stored in the drilling data storage 26, the facing data stored in the facing data storage 28, the planing data stored in the planing data storage 30 and the tool data stored in the tool data storage 34.

Further, the machining program generated by the machining program generation unit 35 is stored in the machining program storage 36.

Figure 33:
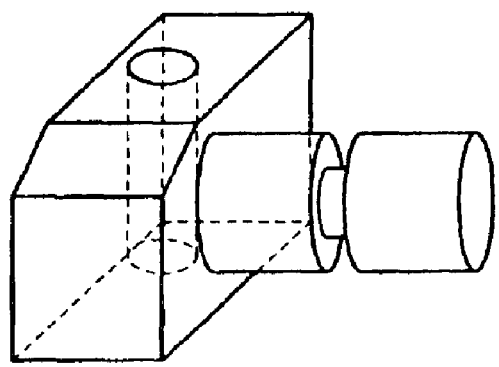
FIG. 33 is a perspective view showing a form machined based on a machining program.
Figure 34:
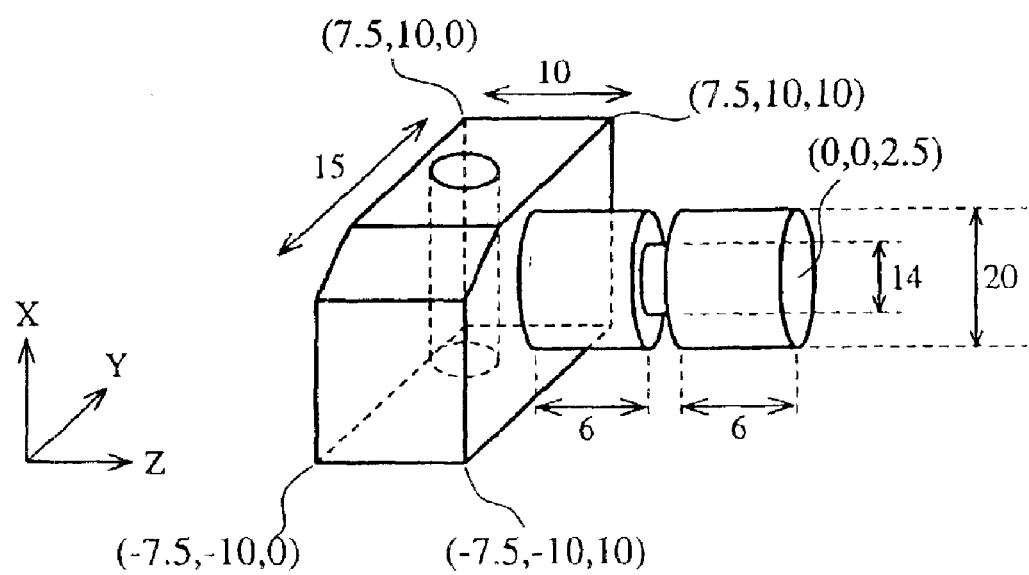
FIG. 34 is an explanatory drawing showing an example of size and coordinates of a machining form.

FIG. 33 is a perspective view showing a form machined by the machining program, and FIG. 34 is a view showing an example of size and coordinates of a machining form. Further, FIG. 35 is a list showing an exemplary machining program.

Here, the machining program consists of form information of materials, position information (sequence data), machining methods for the respective machining units, machining condition information, tool information, machining form information (sequence data) and the like.

As is clear from the above discussion, according to the first embodiment, since the turning data generation unit 23, the drilling data generation unit 25 and the like are provided to generate machining data corresponding to the machining forms generated by the machining form generation unit 21 in consideration of the features of the machining forms, and since the machining program to remove the machining form from the material form on the basis of the generated machining data is generated, it is possible to achieve a proper machining corresponding to the machining form.

Second Embodiment

Figure 36:
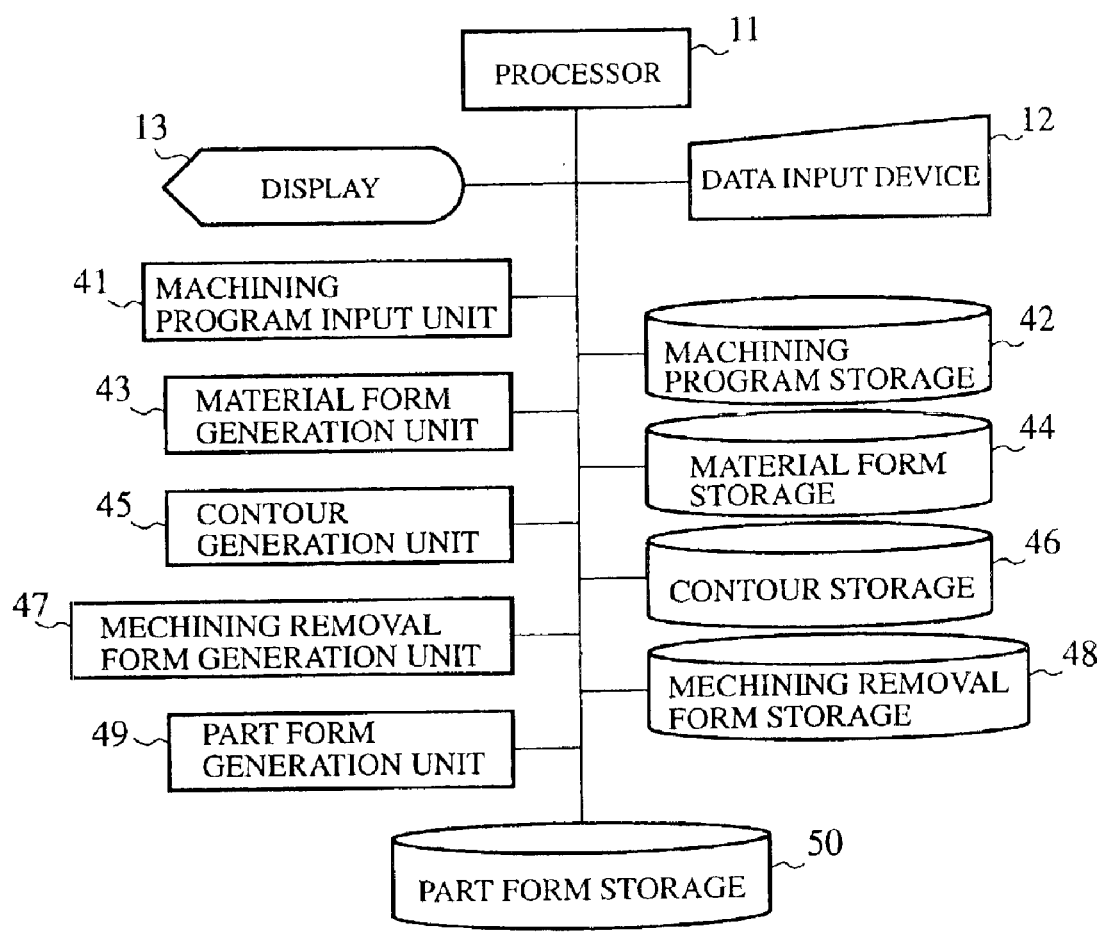
FIG. 36 is a system configuration showing a numerical control programming device according to a second embodiment of the present invention.

FIG. 36 is a block diagram showing a numerical control programming device according to the second embodiment of the present invention. In FIG. 36, like reference numerals as in FIG. 5 represent like components and descriptions thereof are omitted for brevity's sake.

Reference numeral 41 denotes a machining program input unit for inputting therefrom a machining program, reference numeral 42 a machining program storage for storing therein the machining program inputted by the machining program input unit 41, reference numeral 43 a material form generation unit (material form generation means) for generating a solid model for a material form from the machining program stored in the machining program storage 42, reference numeral 44 a material form storage for storing therein the solid model for a material form generated by the material form generation unit 43, reference numeral 45 a contour generation unit (contour generation means) for generating a solid model for a contour from the machining program stored in the machining program storage 42 and reference numeral 46 a contour storage for storing therein the solid model for a contour generated by the contour generation unit 45.

Reference numeral 47 denotes a machining removal form generation unit for generating a solid model for machining removal form from the solid model for a contour stored in the contour storage 46, reference numeral 48 a machining removal form storage for storing therein the solid model for a machining removal form generated by the machining removal form generation unit 47, reference numeral 49 a part form generation unit (part form generation means) for subtracting the solid model for a machining removal form stored in the machining removal form storage 48 from the solid model for a material form stored in the material form storage 44 to generate a solid model for a part form, and reference numeral 50 a part form storage for storing therein the solid model for a part form generated by the part form generation unit 49. Hereinafter, the solid model for a material form is referred to simply as a material form, the solid model for a contour as a contour, the solid model for a machining removal form as a machining removal form and the solid model for a part form as a part form.

FIG. 37 is a flowchart showing a numerical control programming method according to the second embodiment of the present invention.

Next, the operation of the numerical control programming method of the second embodiment will be described.

First, when the machining program input unit 41 is manipulated by an operator to input a machining program (Step ST61), the machining program is displayed on the display 13 (see FIG. 38) and stored into the machining program storage 42.

When the machining program is stored into the machining program storage 42, the material form generation unit 43 generates a material form from the machining program (Step ST62) and stores the material form into the material form storage 44.

Figure 39:
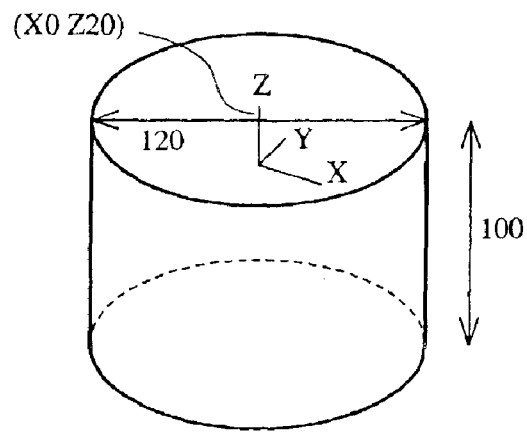
FIG. 39 is a perspective view showing an exemplary material form.

Further, the outside diameter of the machining program indicates the outside diameter of a material cylinder and the inside diameter thereof indicates a diameter of a hollow of the material cylinder, and the material length indicates a height of the material cylinder and the material end face indicates a length from a position of Z=0. FIG. 39 is a perspective view showing an exemplary material form.

The contour generation unit 45 generates a contour on a X-Z plane of Y=0 by the machining program stored in the machining program storage 42 (Step ST63), and stores the contour into the contour storage 46.

Figure 40:
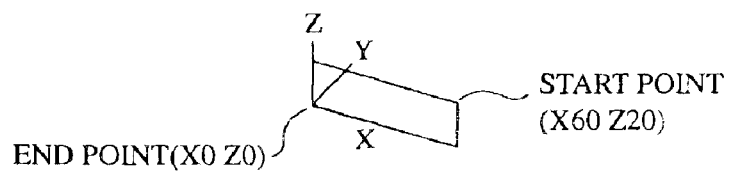
FIG. 40 is a perspective view showing an exemplary contour in a face and peripheral milling.

That is, in a peripheral and end milling, a rectangle is generated so that a start point and an end point of the machining program may be diagonal to each other. FIG. 40 is a perspective view showing an exemplary contour in the peripheral and end milling.

Figure 41:
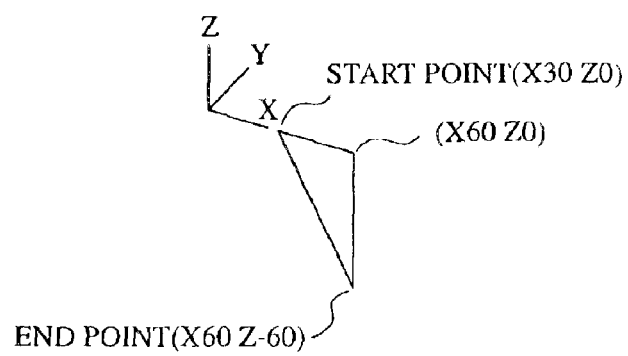
FIG. 41 is a perspective view showing an exemplary contour in the outside diameter machining.

Further, in the outside diameter machining, the start point and the end point of the machining program are connected to each other and then the end point, the value of X of the end point, the value of Z of the start point and the start point are sequentially connected, to generate a contour. FIG. 41 is a perspective view showing an exemplary contour in the outside diameter machining.

Figure 42:
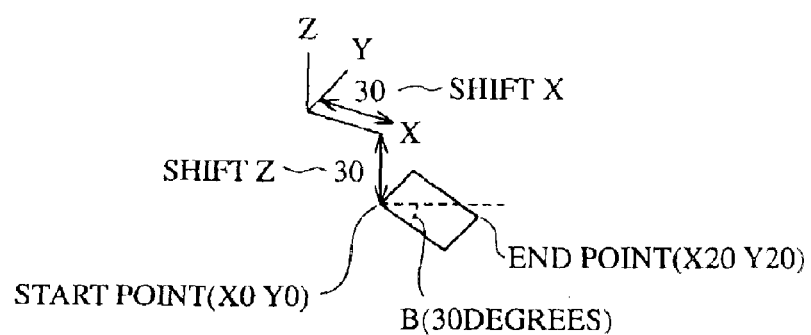
FIG. 42 is a perspective view showing an exemplary contour in a facing.

In the facing, a contour is generated on the basis of form data on a plane obtained through a shifting by the length of shift X in the X-axis direction and the length of shift Z in the Z-axis direction and a rotation from the X axis by an angle B. FIG. 42 is a perspective view showing an exemplary contour in the facing.

After the contour is stored into the contour storage 46, the machining removal form generation unit 47 generates a machining removal form from the contour (Step ST64) and stores the machining removal form into the machining removal form storage 48.

Figure 43:
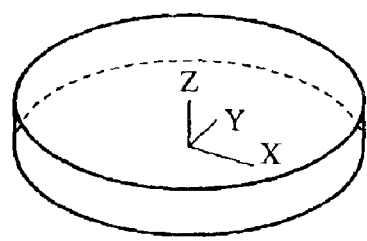
FIG. 43 is a perspective view showing an exemplary machining removal form in a peripheral and end milling.
Figure 44:
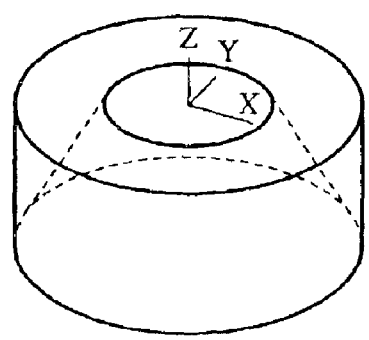
FIG. 44 is a perspective view showing an exemplary machining removal form in the outside diameter machining.
Figure 45:
FIG. 45 is a perspective view showing an exemplary machining removal form in facing.

Here, in the case of turning such as the peripheral and end and face milling or the outside diameter machining, the machining removal form becomes a form obtained by sweeping the contour with the Z axis as the axis of rotation, and in the case of facing, the machining removal form becomes a form obtained by sweeping a face in a vertical direction by the length corresponding to the machining depth in the machining program. FIG. 43 is a perspective view showing an exemplary machining removal form in the peripheral and end milling, FIG. 44 is a perspective view showing an exemplary machining removal form in the outside diameter machining, and FIG. 45 is a perspective view showing an exemplary machining removal form in the facing.

In the peripheral and end milling, the machining removal form is generated by sweeping a tool form of the tool data in the machining removal in accordance with the form data in the machining program.

After the machining removal form is stored into the machining removal form storage 48, the part form generation unit 49 subtracts the solid model for a machining removal form from the solid model for a material form stored in the material form storage 44, to generate a part form (Step ST65), and stores the part form into the part form storage 50.

Figure 46:
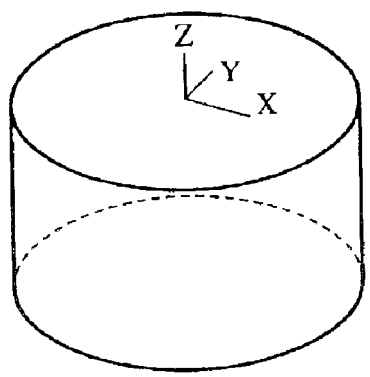
FIG. 46 is a perspective view showing an exemplary form obtained by subtracting a machining removal form in a peripheral and end milling.
Figure 47:
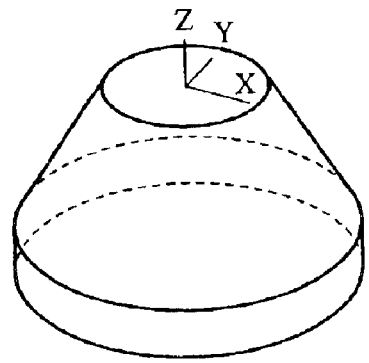
FIG. 47 is a perspective view showing an exemplary form obtained by subtracting a machining removal form in the outside diameter machining.
Figure 48:
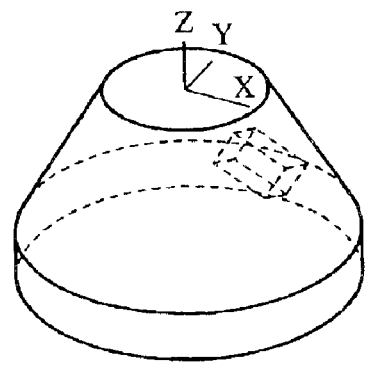
FIG. 48 is a perspective view showing an exemplary form obtained by subtracting a machining removal form in a facing.

FIG. 46 is a perspective view showing an exemplary form obtained by subtracting the machining removal form in the peripheral and end milling, FIG. 47 is a perspective view showing an exemplary form obtained by subtracting the machining removal form in the outside diameter machining, and FIG. 48 is a perspective view showing an exemplary form obtained by subtracting the machining removal form in the facing.

As is clear from the above discussion, according to the second embodiment, since the part form is generated by subtracting the machining removal form generated by the machining removal form generation unit 47 from the material form generated by the material form generation unit 43, it is possible to confirm the part form to be machined without finding a tool locus from the machining program and performing an actual machining.

What is claimed is:

1. A numerical control programming device, comprising:
    part form inputting means for inputting a solid model of a part form;
    material form inputting means for inputting a solid model of a material form;
    machining form generating means for generating a solid model machining form by subtracting the part form from the material form;

turning form generating means for generating a solid model turning form using the part form and the machining form;

turning data generating means for generating turning data by dividing the turning form into first area forms for machining by turning;

drilling form generating means for generating a solid model drilling form using the part form and the machining form;

drilling data generating means for generating drilling data by dividing the drilling form into second area forms for machining by drilling;

facing form generating means for generating a solid model facing form by subtracting, the turning form and the drilling form from the machining form;

facing data generating means for generating facing data by dividing the facing form into third area forms for machining by facing; and machining program generating means for generating a machining program for determining machining methods, a tools, and machining conditions from the turning data, the drilling data, and the facing data.

2. The numerical control programming device according to claim 1, wherein the machining program generating means generates a machining sequence in which drilling is carried out, followed by turning and facing.

3. The numerical control programming device according to claim 1, wherein the drilling form generating means groups drilling forms having common cylindrical axes and conical axes.

4. The numerical control programming device according to claim 1, wherein the facing data generating means divides respective faces, starting from a thinnest face of the facing form, in a vertical direction.

5. A numerical control programming method, comprising the steps of:

inputting a solid model of a part form;

inputting a solid model of a material form;

generating a solid model machining form by subtracting the part form from the material form;

generating a solid model turning form using the part form and the machining form;

generating turning data by dividing the turning form into first area forms for machining by a turning;

generating a solid model drilling form using the part form and the machining form;

generating drilling data by dividing the drilling form into second area forms for machining by drilling;

generating a solid model facing form by subtracting the turning form and the drilling form removed from the machining form;

generating facing data by dividing the facing form into third area forms for machining by facing; and generating a machining program for determining machining methods, tools, and machining conditions from the turning data, the drilling data, and the facing data.

6. The numerical control programming method according to claim 5, including determining a machining sequence in which drilling is carried out, followed by turning and facing.

7. The numerical control programming method according to claim 5, including grouping drilling forms having common cylindrical axes and conical axes.

8. The numerical control programming method according to claim 5, wherein generating facing data includes dividing respective faces, starting from a thinnest face of the facing form in a vertical direction.

* * * * *